US011986687B2

(12) United States Patent
Kim et al.

(10) Patent No.: US 11,986,687 B2
(45) Date of Patent: May 21, 2024

(54) FIRE EXTINGUISHER WITH EASY MANAGEMENT AND USAGE

(71) Applicant: Seung Yun Kim, Seoul (KR)

(72) Inventors: Seung Yun Kim, Seoul (KR); Jin Tai Kim, Seoul (KR); Song Yi Kim, Seoul (KR)

(73) Assignee: Seng Yun Kim, Seoul (KR)

( * ) Notice: Subject to any disclaimer, the term of this patent is extended or adjusted under 35 U.S.C. 154(b) by 455 days.

(21) Appl. No.: 17/432,748

(22) PCT Filed: Feb. 21, 2020

(86) PCT No.: PCT/KR2020/002507
§ 371 (c)(1),
(2) Date: Aug. 20, 2021

(87) PCT Pub. No.: WO2020/171639
PCT Pub. Date: Aug. 27, 2020

(65) Prior Publication Data

US 2022/0143440 A1 May 12, 2022

(30) Foreign Application Priority Data

Feb. 22, 2019 (KR) ........................ 10-2019-0020948
Feb. 20, 2020 (KR) ........................ 10-2020-0020832

(51) Int. Cl.
*A62C 13/76* (2006.01)
*A62C 13/64* (2006.01)

(52) U.S. Cl.
CPC .............. *A62C 13/76* (2013.01); *A62C 13/64* (2013.01)

(58) Field of Classification Search
CPC .......... A62C 13/62; A62C 13/64; A62C 13/76
(Continued)

(56) References Cited

U.S. PATENT DOCUMENTS 2,605,848 A * 8/1952 Carter .................. A62C 13/006 222/3
2,680,546 A * 6/1954 Seaberg .................. F17C 13/04 285/119
(Continued)

FOREIGN PATENT DOCUMENTS

CN 109381824 A * 2/2019 ............. A62C 13/76
CN 109432648 A * 3/2019 ............. A62C 13/76
(Continued)

OTHER PUBLICATIONS

International Search Report dated Jun. 10, 2020 for corresponding international application No. PCT/KR2020/002507 citing the above reference(s).

(Continued)

*Primary Examiner* — Darren W Gorman
(74) *Attorney, Agent, or Firm* — Hauptman Ham, LLP

(57) ABSTRACT

Provided is a fire extinguisher which reduces a risk of a discharge accident caused when a stopper is unintentionally separated at a normal time and from which a handle is easily pulled out when fire occurs. According to the fire extinguisher, a force pressing an upper handle is not transmitted to a valve stem as a gap between the upper handle and a plug is maintained by a gap support part when the stopper is installed on the handle, and the force pressing an upper handle is transmitted to the valve stem through a valve pressing part as the gap support part horizontally moves by an elastic member so as not to overlap the plug when the stopper is separated from the handle.

7 Claims, 8 Drawing Sheets

(58) Field of Classification Search
USPC ................................................ 169/75–77, 89
See application file for complete search history.

(56) References Cited

U.S. PATENT DOCUMENTS

| | | | | |
|---|---|---|---|---|
| 3,010,520 | A * | 11/1961 | Seaberg | A62C 13/64 169/77 |
| 4,705,064 | A * | 11/1987 | Self | F17C 13/123 292/307 R |
| 6,378,618 | B1 * | 4/2002 | Yang | A62C 13/76 169/88 |
| 2010/0319939 | A1 * | 12/2010 | Kim | A62C 13/76 169/75 |
| 2018/0311520 | A1 * | 11/2018 | Kim | A62C 13/64 |
| 2019/0001168 | A1 * | 1/2019 | Choi | A62C 13/76 |
| 2019/0134442 | A1 * | 5/2019 | Bacchin | A62C 37/50 |

FOREIGN PATENT DOCUMENTS

| | | | | |
|---|---|---|---|---|
| EP | 0579520 | B1 * | 3/1997 | A62C 13/76 |
| JP | 10-248952 | A | 9/1998 | |
| KR | 20-0248841 | Y1 | 11/2001 | |
| KR | 10-1523224 | B1 | 5/2015 | |
| KR | 10-2017-0038180 | A | 4/2017 | |
| KR | 10-1808080 | B1 | 12/2017 | |
| WO | WO-2018186784 | A1 * | 10/2018 | A62C 13/00 |

OTHER PUBLICATIONS

Written Opinion issued for corresponding International Patent Application No. PCT/KR2020/002507 dated Jun. 10, 2020 citing the above reference(s).

* cited by examiner

FIRE EXTINGUISHER WITH EASY MANAGEMENT AND USAGE

CROSS-REFERENCE TO RELATED APPLICATION

The present application is a national stage filing under 35 U.S.C § 371 of PCT application number PCT/KR2020/002507 filed on Feb. 21, 2020 which is based upon and claims the benefit of priorities to Korean Patent Application No. 10-2019-0020948, filed on Feb. 22, 2019 and Korean Patent Application No. 10-2020-0020832, filed on Feb. 20, 2020 in the Korean Intellectual Property Office, which are incorporated herein in their entireties by reference.

TECHNICAL FIELD

The present invention relates to a fire extinguisher, and more particularly, to a fire extinguisher that is easily managed in a normal time and easily used by a user when fire occurs.

BACKGROUND ART

In case of a typical fire extinguisher that is widely known and distributed, a limitation caused by a safety pin has been generated.

Firstly, the safety pin is not easily pulled out when fire actually occurs. When fire occurs, initial extinguishment using the fire extinguisher before a fire truck is arrived is extremely important. However, since a person who finds fire is mostly embarrassed and has almost no experience to use the fire extinguisher, the person shows a behavior pattern of trying to pull out the safety pin while holding up the fire extinguisher by hands. In consideration of characteristics of the typical fire extinguisher, when the fire extinguisher is held by hands, particularly the embarrassed person unconsciously holds the handle with a strong grasping force, and thus the safety pin is not easily pulled out. Thus, a golden time for initial extinguishment of the fire is frequently lost.

Secondly, since the safety pin is loosely inserted to the fire extinguisher at a normal time, the safety pin is unintentionally easily separated to cause a discharge accident. Furthermore, since the safety pin of the typical fire extinguisher is inserted to the handle of the fire extinguisher in a horizontal direction, even when the safety pin is separated, it is not easily recognized.

In order to prevent the safety pin that is loosely inserted to the handle from being naturally separated, a method of binding the safety pin to the handle using a binding rope is forcedly used over the world. Although the binding rope is relatively weak and easily cut by pulling with a force, users who do not know this fact may be embarrassed when the users find the safety pin bound by using the binding rope.

DISCLOSURE OF THE INVENTION

Technical Problem

The present invention provides a fire extinguisher having a stopper that is easily removed by a user when fire occurs and is not naturally separated from a handle at a normal time and having a further simple usage method.

The object of the present invention is not limited to the aforesaid, but other objects not described herein will be clearly understood by those skilled in the art from descriptions below.

Technical Solution

An embodiment of the present invention provides a fire extinguisher including: a main body container 60 filled with an extinguisher agent; a lower handle 20 coupled to a plug 62 disposed at an upper portion of the main body container; an upper handle 10 coupled to the lower handle through a first hinge shaft; a valve stem 64 installed at an upper portion of the plug to control discharge of the extinguishing agent through a vertical movement thereof; a rotary lever 50 coupled to the lower handle or the plug through a second hinge shaft; a discharge safety device 30 connected to the rotary lever and disposed between the upper handle and the plug to horizontally move; an elastic member installed on the rotary lever or the discharge safety device to allow the discharge safety device to horizontally move; and a stopper configured to block the horizontal movement of the discharge safety device, and the discharge safety device includes: a body part; a gap support part protruding from the body part to the plug to maintain a gap between the upper handle and the plug; and a valve pressing part protruding from the body part to the valve stem.

When the stopper is installed on the upper handle, a force pressing the upper handle may not be transmitted to the valve stem as the gap between the upper handle and the plug is maintained by the gap support part, and when the stopper is separated from the upper handle, the force pressing the upper handle may be transmitted to the valve stem through the valve pressing part as the gap support part horizontally moves by the elastic member so as not to overlap the plug.

The elastic member may be a rotary spring formed on the second hinge shaft, and when the rotary spring lifts the rotary lever horizontally, the discharge safety device connected to the rotary lever may horizontally move between the upper handle and the plug.

The stopper may pass through the upper handle in a horizontal direction or in a vertical direction.

One pair of gap support parts may be disposed at both sides of the valve stem, respectively, the valve pressing part may be disposed between the one pair of gap support parts, and the gap support part may protrude toward the plug further than the valve pressing part.

The discharge safety device may be coupled with the rotary lever through an arm, and the rotary lever and the arm or the arm and the discharge safety device may be hinge-coupled to each other.

The elastic member may be a coil spring configured to connect the gap support part and an end of the upper handle.

Particularities of other embodiments are included in the detailed description and drawings.

Advantageous Effects

As described above, the fire extinguisher according to the present invention exhibits excellent effects as stated below.

Firstly, since the elastic member applies a constant pressure to the stopper in the horizontal direction at the normal time, the risk of the discharge accident may be reduced by preventing the stopper from being unintentionally separated from the handle. Thus, the stopper is not necessary to be additionally tied to the handle.

Secondarily, when the stopper is accidentally separated from the handle at the normal time, since the rotary lever is partially lifted by the elastic member, the state of the fire extinguisher may be easily recognized.

Thirdly, when the user tries to pull out the stopper in the state in which the embarrassed user holds the handle of the fire extinguisher tightly in case of fire occurrence, the stopper of the present invention may be easily pulled out from the hands with a small force while the stopper of the typical fire extinguisher is not pulled out. This is because the force pressing the handle of the fire extinguisher is transmitted only to the discharge safety device and is not used to press the stopper.

Fourthly, as the usage process is simplified more than that of the typical fire extinguisher, the golden time for the initial extinguishment may be reduced.

MODE FOR CARRYING OUT THE INVENTION

Figure 1:
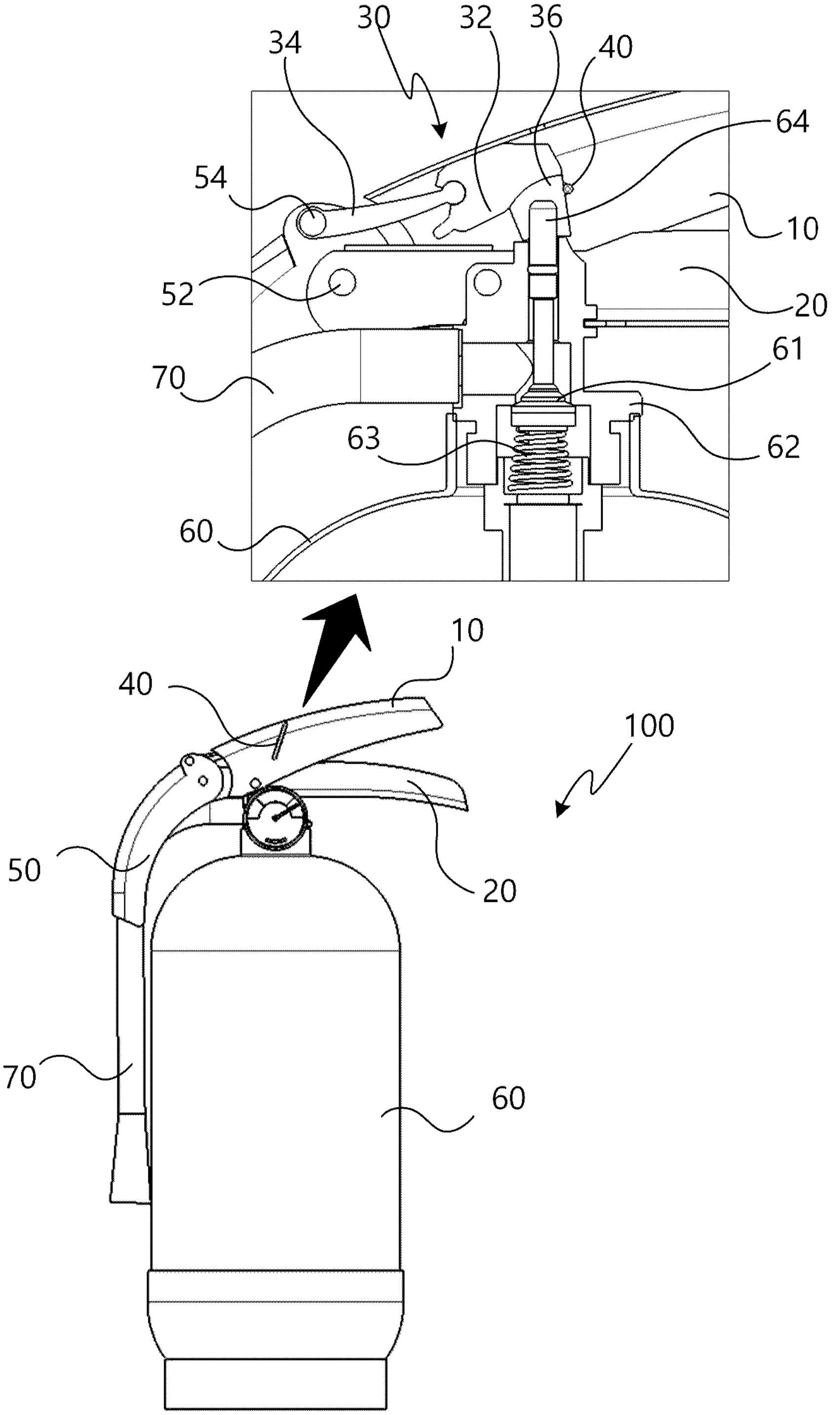
FIG. 1 is a front view and a partial cross-sectional view of a fire extinguisher according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Like reference numerals refer to like elements throughout.

A discharge safety device of the present invention may be applied to various fire extinguishers including upper and lower handles (or levers), e.g., a powder fire extinguisher, a halogenated compound fire extinguisher, a carbon dioxide fire extinguisher, and a loaded stream fire extinguisher. Thus, the powder fire extinguisher mentioned in embodiments of the present invention is only illustrative, and the present invention is not limited thereto. For example, when the discharge safety device of the present invention is applied to a fire extinguisher without a discharge hose, a rotary lever may have a different shape instead of a shape surrounding one side portion of the discharge hose.

Figure 2:
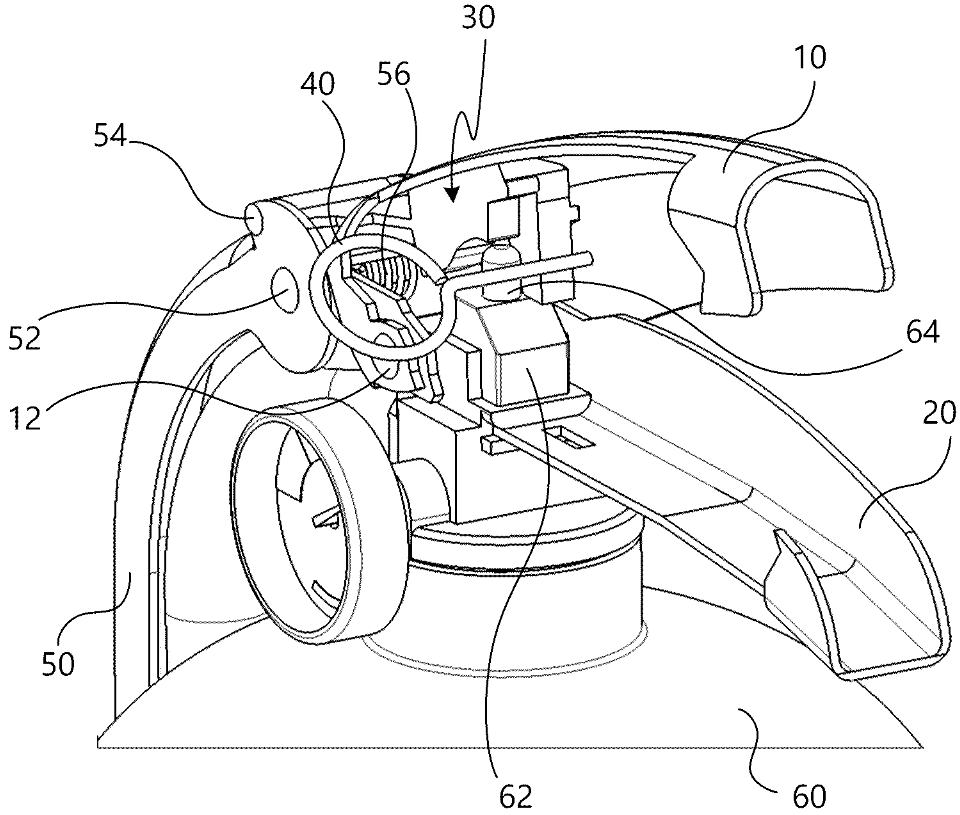
FIG. 2 is a partially cut perspective view of the fire extinguisher of FIG. 1.
Figure 3:
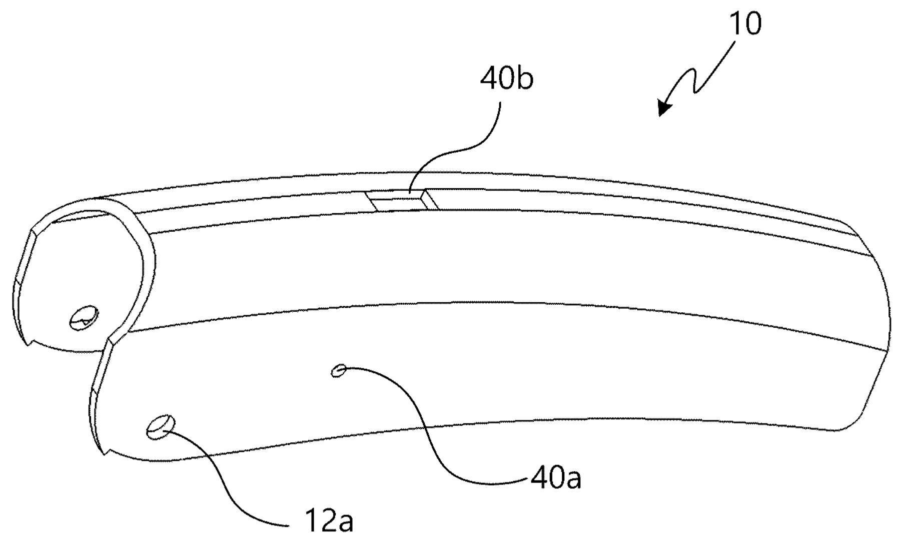
FIG. 3 is a perspective view of an upper handle of FIG. 1.
Figure 4:
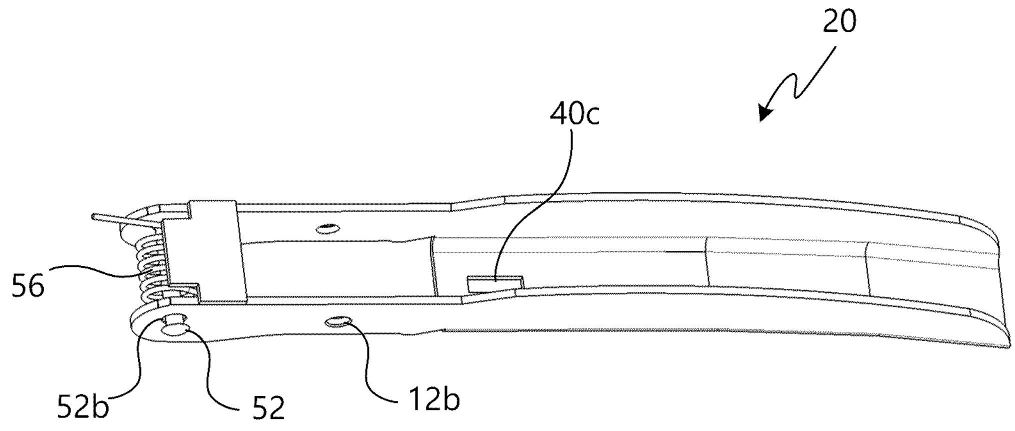
FIG. 4 is a perspective view of a lower handle of FIG. 1.
Figure 5:
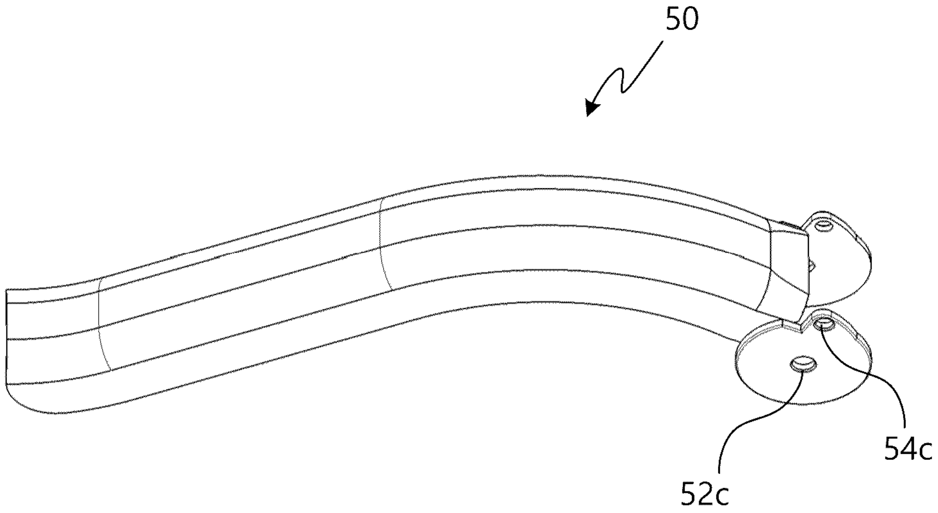
FIG. 5 is a perspective view of a rotary lever of FIG. 1.
Figure 6:
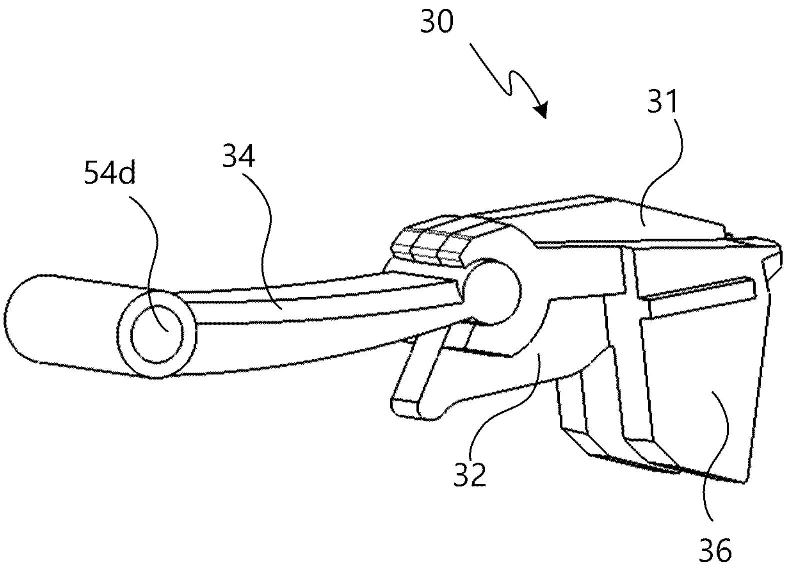
FIG. 6 is a perspective view of a discharge safety device included in the fire extinguisher of FIG. 1.

Hereinafter, a fire extinguisher according to an embodiment of the present invention will be described with reference to FIGS. 1 to 6. Here, FIG. 1 is a front view and a partial cross-sectional view of the fire extinguisher according to an embodiment of the present invention. FIG. 2 is a partially cut perspective view of the fire extinguisher of FIG. 1. FIG. 3 is a perspective view of an upper handle of FIG. 1. FIG. 4 is a perspective view of a lower handle of FIG. 1. FIG. 5 is a perspective view of a rotary lever of FIG. 1. FIG. 6 is a perspective view of a discharge safety device included in the fire extinguisher of FIG. 1.

Firstly, referring to FIGS. 1 and 2, a fire extinguisher 100 of the present invention includes: a main body container 60 filled with an extinguishing agent; a lower handle 20 coupled to a plug 62 disposed at an upper portion of the main body container 60; a discharge hose 70 connected to the plug 62; an upper handle 10 coupled with the lower handle 20 through a first hinge shaft 12; a valve stem 64 installed at an upper portion of the plug 62 and vertically moving to control discharge of the extinguishing agent; a rotary lever 50 coupled to the lower handle 20 or the plug 62 through a second hinge shaft 52; a discharge safety device 30 connected to the rotary lever 50 and disposed between the upper handle 10 and the plug 62 to horizontally move; an elastic member 56 installed in the rotary lever 50 and allowing the discharge safety device 30 to horizontally move; and a stopper 40 installed on the upper handle 10 to stop horizontal movement of the discharge safety device 30.

Specifically, the plug 62 is screw-coupled to the upper portion of the main body container 60. The valve stem 64 is installed inside the plug 62, and a valve rubber 61 is installed at a lower end of the valve stem 64. Sealing between the valve rubber 61 and the plug 62 is maintained as a valve spring 63 disposed below the valve rubber 61 applies a force in an upward direction to the valve rubber 61 and the valve stem 64. The discharge of the extinguishing agent may be controlled by the vertical movement of the valve stem 64. When the discharge safety device 30, especially a valve pressing part 32, pushes the valve stem 64 downward by pushing the upper handle 10 in case of fire occurrence, the filled extinguishing agent is discharged through a gap generated between the valve rubber 61 and the plug 62 and through the discharge hose 70.

Referring to FIG. 3, the upper handle 10 includes an overall long plate and sidewalls formed at side portions of the plate. The upper handle 10 may have, e.g., a U-shaped cross-section so that the discharge safety device 30 horizontally moves in the upper handle 10. The upper handle 10 is coupled with the lower handle 20 through the first hinge shaft 12, and to this end, a hole 12*a* to which the first hinge shaft 12 is inserted is defined in the sidewall of the upper handle 10.

A hole 40*a* to which the stopper 40 is inserted may be defined in the sidewall of the upper handle 10. The stopper 40, as a member installed on the upper handle 10 to block the horizontal movement of the discharge safety device 30, may be made of a rigid material. For example, the stopper 40 may include a safety pin. Referring to FIGS. 2 and 3, the stopper 40 may pass through the upper handle 10 in a horizontal direction through the hole 40*a* and be disposed behind the discharge safety device 30 to effectively block the movement of the discharge safety device 30.

Referring to FIG. 4, the lower handle 20 includes an overall long plate and sidewalls formed at side portions of the plate. An opening to which the plug 62 is inserted is defined in the plate of the lower handle 20. The lower handle 20 is coupled with the upper handle 10 through the first hinge shaft 12, and to this end, a hole 12*b* to which the first hinge shaft 12 is inserted is defined in the sidewall of the lower handle 20. Also, the lower handle 20 is coupled with the rotary lever 50 through the second hinge shaft 52, and to this end, a hole 52*b* to which the second hinge shaft 52 is inserted is defined in the sidewall of the lower handle 20.

The elastic member 56 may include, e.g., a rotary spring formed on the second hinge shaft 52. The elastic member 56 may be installed around the second hinge shaft 52 between the rotary lever 50 and the lower handle 20. The elastic member 56 may allow the discharge safety device 30 connected to the rotary lever 50 to horizontally move between the upper handle 10 and the plug 62 when the elastic member 56 lifts the rotary lever 50 horizontally with respect to the lower handle 20.

Referring to FIG. 5, the rotary lever 50 may an overall gently curved shape to cover at least one side portion of the discharge hose 70 and have, e.g., a U-shaped cross-section. The rotary lever 50 is coupled to the lower handle 20 through the second hinge shaft 52, and to this end, a hole 52*c* to which the second hinge shaft 52 is inserted is defined in a sidewall of the rotary lever 50. However, the present invention is not limited thereto. For example, the rotary lever 50 may be hinge-coupled to the plug 62. The rotary lever 50 is coupled with the discharge safety device 30 by using an arm 34, and a hole 54*c* may be defined in the sidewall of the rotary lever 50 for the coupling between the rotary lever 50 and the arm 34.

Referring to FIG. 6, the discharge safety device 30 includes a body part 31, a gap support part 36 protruding downward from the body part 31 to the plug 62, and a valve pressing part 32 protruding from the body part 31 to the valve stem 64.

The gap support part 36 supports the upper handle 10 and the plug 62 to maintain a gap therebetween, and the valve pressing part 32 transmits a force pressing the upper handle 10 to the valve stem 64. One pair of gap support parts 36 may be disposed at both sides of the valve stem 64, respectively, and the valve pressing part 32 may be disposed between the one pair of gap support parts 36. The gap support part 36 and the valve pressing part 32 may form a stepped portion in a longitudinal direction of the fire extinguisher 100, i.e., the gap support part 36 may further protrude from the body part 31 to the plug 62 than the valve pressing part 32.

The discharge safety device 30 is coupled with the rotary lever 50 through the arm 34. Firstly, the arm 34 and the rotary lever 50 may be coupled with various types, e.g., hinge coupling. In this case, the arm 34 and the rotary lever 50 may be coupled by the hinge shaft 54 passing through the hole 54*d* of the arm 34 and the hole 54*c* of the rotary lever 50. Also, the arm 34 and the discharge safety device 30 may be coupled with various types, e.g., the hinge coupling. Although the rotary lever 50, the arm 34, and the discharge safety device 30 are exemplarily described as separate components in this embodiment, the present invention is not limited thereto. For example, the rotary lever 50 and the arm 34 may be substantially integrated with the same material, the arm 34 and the discharge safety device 30 may be substantially integrated with the same material, and the rotary lever 50, the arm 34, and the discharge safety device 30 may be substantially integrated with the same material.

Figure 7:
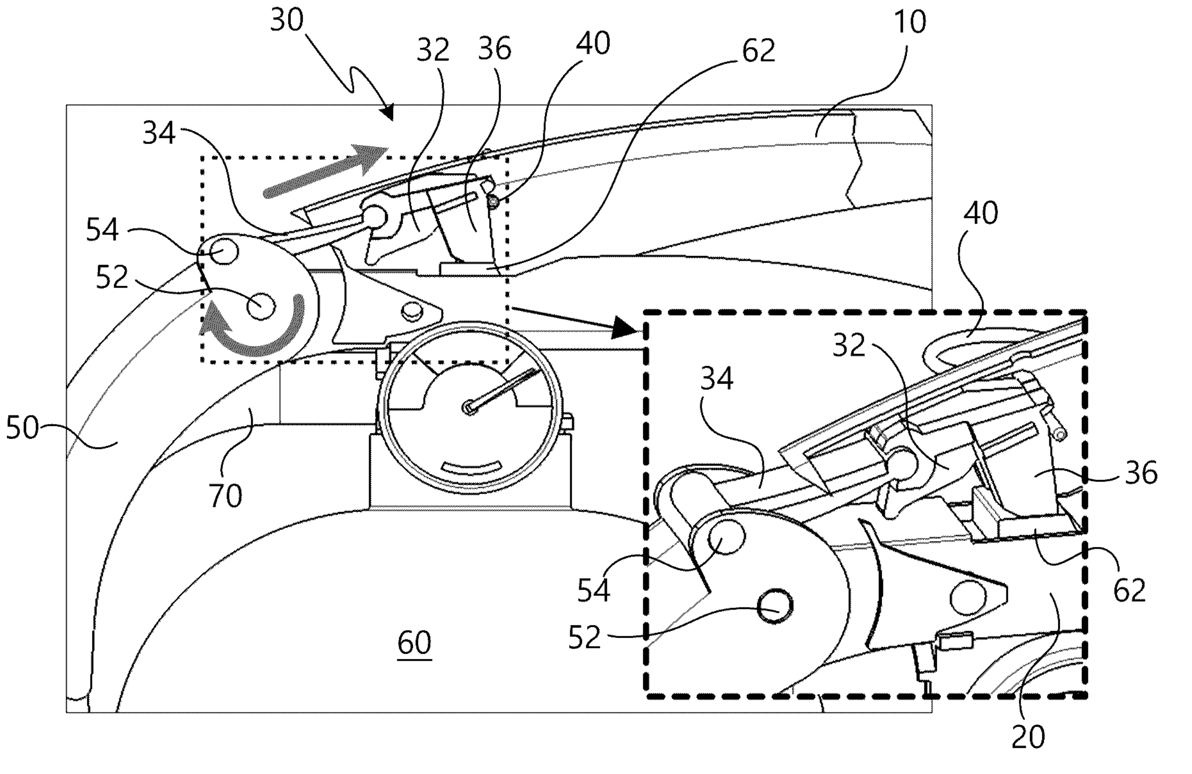
FIG. 7 is a view of the fire extinguisher according the present invention in a stopper mounted state at a normal time.
Figure 8:
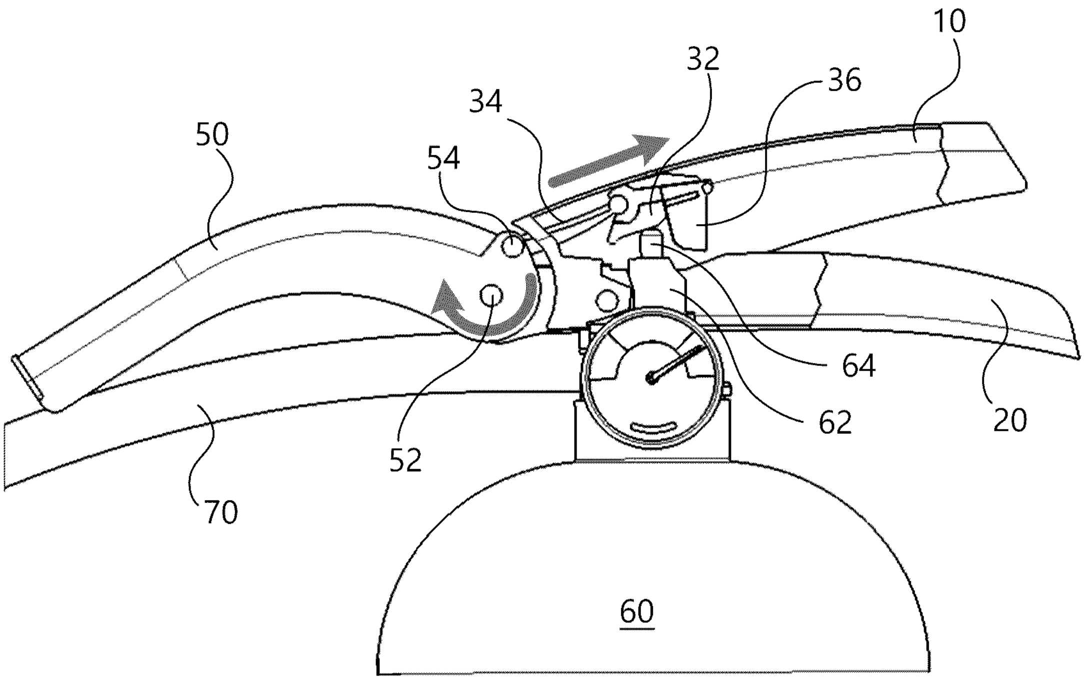
FIG. 8 is a view of the fire extinguisher according the present invention in a stopper removed state when fire occurs.

Hereinafter, a method for operating the fire extinguisher according to an embodiment of the present invention will be described with reference to FIGS. 7 to 8. Here, FIG. 7 is a view illustrating the fire extinguisher according the present invention in a stopper mounted state at a normal time. FIG. 8 is a view illustrating the fire extinguisher according the present invention in a stopper removed state when fire occurs.

Referring to FIG. 7, when the stopper 40 is installed on the upper handle 10, the movement of the discharge safety device 30 may be blocked by the stopper 40 although the elastic member 56 installed on the rotary lever 50 pushes the discharge safety device 30 connected with the rotary lever 50 in a horizontal direction (a right direction in FIG. 7). Since the gap support part 36 maintains the gap between the upper handle 10 and the plug 62 when the discharge safety device 30 is disposed at the above-described position, although a user presses the upper handle 10, the pressing force is not transmitted to the valve stem 64. Furthermore, since a constant pressure is applied to the stopper 40 in the horizontal direction by a rotary force of the elastic member 56, the stopper 40 may not be unintentionally separated from the upper handle 10.

Referring to FIG. 8, when the stopper 40 is separated from the upper handle 10, the elastic member 56 installed on the rotary lever 50 lifts the rotary lever 50 to push the discharge safety device 30 connected to the rotary lever 50 in the horizontal direction (the right direction in FIG. 7). When the discharge safety device 30 is disposed at the above-described position, the gap support part 36 horizontally moves by the elastic member 56 not to overlap the plug 62, and a unit for maintaining the gap between the upper handle 10 and the plug 62 is disappeared. Thus, the force pressing the upper handle 10 is transmitted to the valve stem 64 through the valve pressing part 32. That is, when the user holds and grasps the upper handle 10 and the lower handle 20, the valve pressing part 32 presses the valve stem 64 downward, and the extinguishing agent is discharged to the outside through the discharge hose 70.

Figure 9:
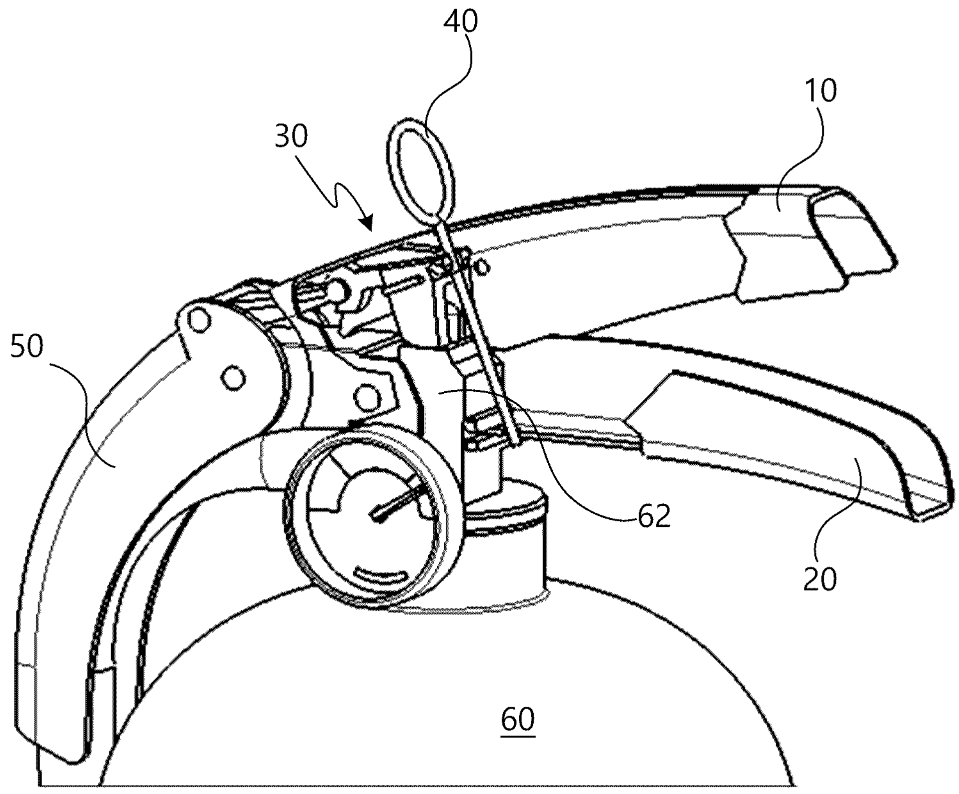
FIG. 9 is a partially cut perspective view of the fire extinguisher according to another embodiment of the present invention.

A fire extinguisher according to another embodiment of the present invention will be descried with reference to FIG. 9. FIG. 9 is a partially cut perspective view of the fire extinguisher according to another embodiment of the present invention. For convenience of description, different points with the previous embodiment (FIGS. 1 to 8) will be mainly described.

As illustrated in FIG. 9, this embodiment, in which a stopper 40 passes the upper handle 10 in a vertical direction, may obtain the substantially same action and effect as the previous embodiment. A hole (40*b* of FIG. 3) may be defined in a plate of the upper handle 10, and a hole (40*c* of FIG. 4) may be defined in a plate of the lower handle 20 so that the stopper 40 vertically passes the upper handle 10 and fixed to the lower handle 20.

Figure 10:
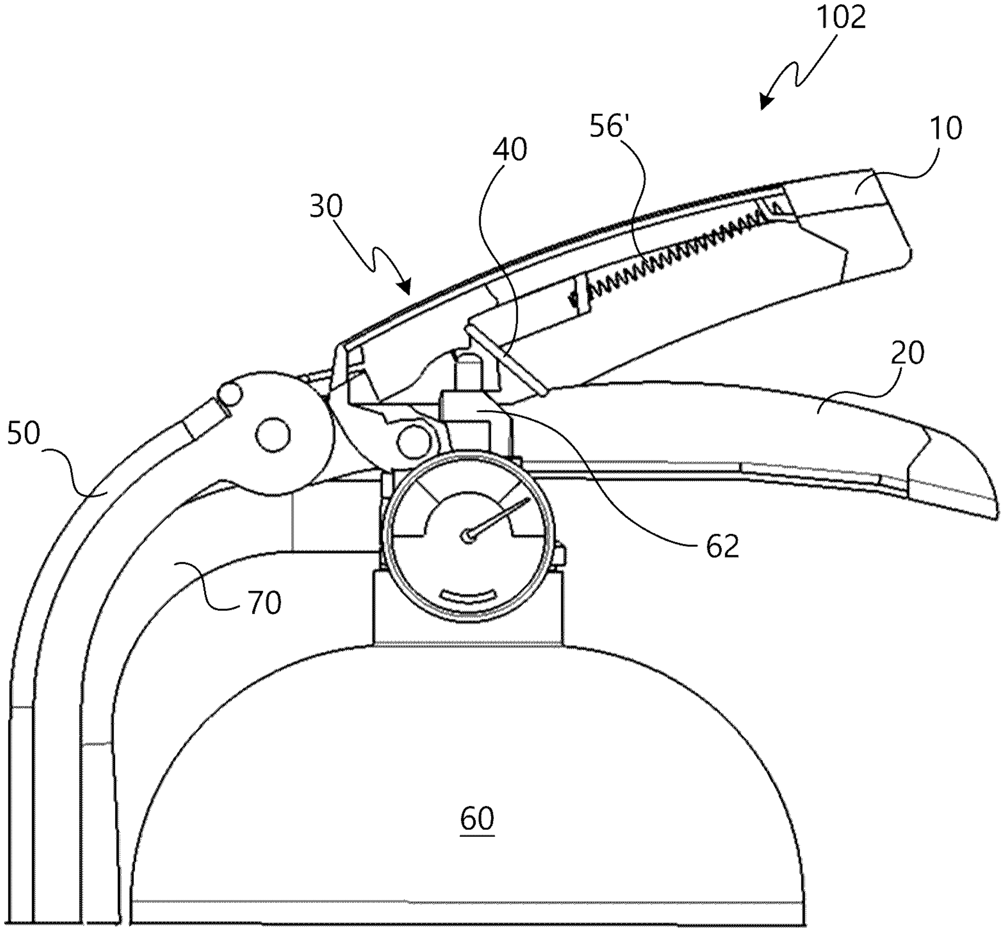
FIG. 10 is a partially cut perspective view of the fire extinguisher according to another embodiment of the present invention.

A fire extinguisher 102 according to another embodiment of the present invention will be descried with reference to FIG. 10. FIG. 10 is a partially cut perspective view of the fire extinguisher according to another embodiment of the present invention. For convenience of description, different points with the previous embodiment (FIGS. 1 to 8) will be mainly described.

As illustrated in FIG. 10, when a rotary lever 50 is connected to one side of a discharge safety device 30, an elastic member 56' is installed on the other side of the discharge safety device 30 to pull the discharge safety device 30 in a horizontal direction (a right direction in FIG. 10). For example, the elastic member 56' may include a coil spring for connecting the gap support part 36 and an end of the upper handle 10.

Although the safety pin, as a stopper, installed on the upper handle or on the upper and lower handles, is exemplarily described in the embodiments, the present invention is not limited thereto. The stopper of the present invention may be an arbitrary unit for blocking the horizontal movement of the discharge safety device, and, for example, an accommodation holder installed on the main body container to accommodate the discharge hose or the rotary lever may serve as the stopper. In this case, although the safety pin or the stopper is not installed on the handle, the substantially same action and effect may be obtained.

Although the embodiment of the inventive concept is described with reference to the accompanying drawings, those with ordinary skill in the technical field of the inventive concept pertains will be understood that the present disclosure can be carried out in other specific forms without changing the technical idea or essential features. Thus, the above-disclosed embodiments are to be considered illustrative and not restrictive.

The invention claimed is:

1. A fire extinguisher comprising:

a main body container (60) filled with an extinguishing agent;

a lower handle (20) coupled to a plug (62) disposed at an upper portion of the main body container;

an upper handle (10) coupled to the lower handle through a first hinge shaft;

a valve stem (64) installed at an upper portion of the plug to control discharge of the extinguishing agent through a vertical movement thereof;

a rotary lever (50) coupled to the lower handle or the plug through a second hinge shaft;

a discharge safety device (30) connected to the rotary lever and disposed between the upper handle and the plug to horizontally move;

an elastic member installed on the rotary lever or the discharge safety device to allow the discharge safety device to horizontally move; and a stopper configured to block the horizontal movement of the discharge safety device, wherein the discharge safety device comprises: a body part; a gap support part protruding from the body part to the plug to maintain a gap between the upper handle and the plug; and a valve pressing part protruding from the body part to the valve stem.

2. The fire extinguisher of claim 1, wherein when the stopper is installed on the upper handle, a force pressing the upper handle is not transmitted to the valve stem as the gap between the upper handle and the plug is maintained by the gap support part, and when the stopper is separated from the upper handle, the force pressing the upper handle is transmitted to the valve stem through the valve pressing part as the gap support part horizontally moves by the elastic member so as not to overlap the plug.

3. The fire extinguisher of claim 1, wherein the elastic member is a rotary spring formed on the second hinge shaft, and when the rotary spring lifts the rotary lever horizontally, the discharge safety device connected to the rotary lever horizontally moves between the upper handle and the plug.

4. The fire extinguisher of claim 1, wherein the stopper passes through the upper handle in a horizontal direction or in a vertical direction.

5. The fire extinguisher of claim 1, wherein one pair of gap support parts are disposed at both sides of the valve stem, respectively, the valve pressing part is disposed between the one pair of gap support parts, and the gap support parts protrude toward the plug further than the valve pressing part.

6. The fire extinguisher of claim 1, wherein the discharge safety device is coupled with the rotary lever through an arm, and the rotary lever and the arm or the arm and the discharge safety device are hinge-coupled to each other.

7. The fire extinguisher of claim 1, wherein the elastic member is a coil spring configured to connect the gap support part and an end of the upper handle.

* * * * *